Oct. 9, 1945.   G. A. LYON   2,386,229

WHEEL STRUCTURE

Filed April 7, 1943

Inventor
GEORGE ALBERT LYON.
by Charles W. Hills Attys.

Patented Oct. 9, 1945

2,386,229

UNITED STATES PATENT OFFICE 2,386,229

WHEEL STRUCTURE

George Albert Lyon, Allenhurst, N. J.

Application April 7, 1943, Serial No. 482,096

5 Claims. (Cl. 301—37)

This invention relates to an improved wheel structure for automobiles or the like and is directed more particularly to an improved cover assembly therefor.

One of the objects of the present invention is to provide for a wheel structure, an annular cover member formed from a sheet material such as synthetic plastic, rubber either synthetic or natural, or a thin springy metal giving it resiliently, locally flexible characteristics whereby the cover member may be flexed locally temporarily from the outer side of a wheel structure over which it is disposed to render the rear side thereof accessible and when released will spring back into a normal wheel covering position.

Still another object of the invention is to provide improved retaining means for securing a cover member to a wheel structure.

Another object of the invention is to provide for a cover having the above mentioned characteristics, an improved retaining arrangement whereby it will not be fulcrumed out of engagement with the wheel structure when pivoted about an edge thereof secured to the wheel structure.

Still another object of the invention is to provide an improved retaining arrangement for a cover member having the above described characteristics whereby, during flexure thereof away from the wheel structure severe bending stresses will not be imposed locally at the inner peripheral part thereof to fatigue and break the cover member at that point.

Still another object of the invention is to provide an annular cover member having resiliently flexible characteristics which is provided at the inner peripheral edge thereof with a retaining, reinforcing bead, this bead being so formed relative to the body portion of the cover member that flexure of the latter may be had by pivotal movement thereof about the bead as the pivot point, the bead cooperating with the retaining means therefor in such a manner that axially outward flexure of the cover member is obtained by rotation of the bead within the retaining means, rather than by bending of the body of the cover member about the retaining means.

In accordance with the general features of this invention there is provided herein a cover assembly including an outer annular, resiliently, flexible portion having a cross-sectional configuration of such shape and magnitude that the outer peripheral edge thereof may be disposed in the vicinity of the edge portion of the tire rim of a wheel structure with which it is associated or may extend therebeyond to overlie the junction between the tire rim and a tire therein, the inner edge thereof extending radially inwardly beyond the junction between the tire rim of the wheel structure and a central load bearing portion thereof to constitute in effect a side wall of the tire in the tire rim and to give the appearance of being a part thereof so as to appear as a white side wall of a massive tire when colored white.

Still another object of the invention is to provide, for a wheel structure, a cover assembly including an annular portion having an inner peripheral reinforcing, retaining bead formed to extend substantially radially inwardly of the exposed surface of the cover member whereby radially inward, axially outward flexure of the cover member relative to the wheel structure over which it is disposed will occur largely about the bead as the pivot for this movement whereby the imposition of undue bending stresses upon the inner peripheral part of the cover member in the vicinity of the retaining means will be avoided.

In accordance with other general features of this invention, there is provided herein for a wheel structure a retaining member including a portion providing a radially outwardly opening groove arranged to receive a peripheral retaining bead formed at the radially inner edge of a resiliently flexible, annular cover member in such a manner that axially outward, radially inward flexure of the cover member relative to a wheel structure to which the retaining means is engaged will be obtained by virtue of pivot action of the bead within the groove of the retaining means rather than by bending of the cover member at the radially inner portion thereof about the retaining means, the retaining means serving also as an ornamental border for the inner peripheral edge of the annular cover member.

Still another object of the invention is to provide for a wheel structure, an improved cover assembly including a resiliently flexible, annular cover member and an annular retaining member having a part formed to provide a radially outwardly opening groove for elastically receiving the inner peripheral edge of the annular cover member, the cover member being attachable over the retaining means by virtue of distortion of a part thereof radially inwardly into the groove of the retaining member thereby to permit insertion of the remaining part of the inner peripheral edge of the cover member in axial alignment therewith so that release of the cover member will permit the same to flex into a position of concentricity relative to the groove in the retaining member and to the wheel structure.

Still a further object of the invention is to provide for a wheel structure having a tire rim with a tire mounted therein, a cover member, either in the form of an annulus or a disk, having the outer peripheral portion thereof extending radially outwardly over the outer side of the tire rim to conceal the same and having a cross-sectional configuration of such curvature and magnitude that it constitutes in effect a continuation of the side wall of the tire in the tire rim to give the appearance of being a part thereof and to give the appearance of being the white side wall of a massive tire on a wheel structure of minimum dimensions when the cover member is colored white, said cover member having the outer peripheral edge thereof extending radially outwardly beyond the edge portion of the tire rim to conceal the junction between the same and the outer side wall of the tire, the edge of the cover member being formed to provide a reinforcement bead which additionally presents to the side wall of the tire a smooth non-cutting, non-abrading surface.

Other objects and advantages of the invention will become apparent from the following description and accompanying drawing in which.

Figure 1:
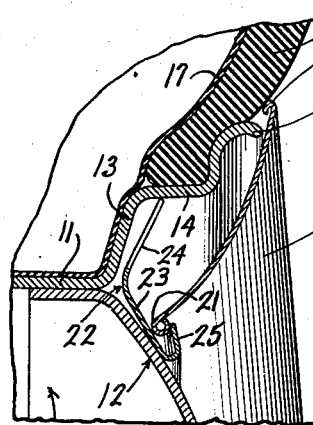
Figure 1 is a fragmentary, broken cross-sectional view of a wheel structure embodying my invention and showing the first step in the application of a cover member to the wheel structure.
Figure 2:
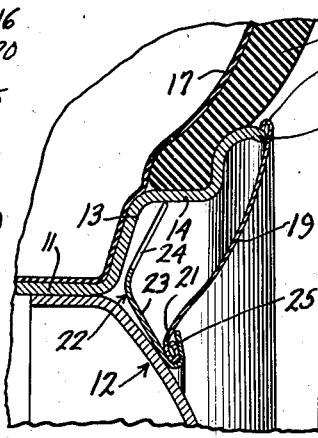
Figure 2 is a view similar to Figure 1 showing the succeeding step in the application of the cover member to the wheel structure.
Figure 3:
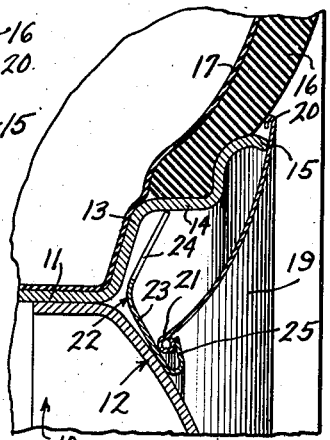
Figure 3 is a view similar to Figures 1 and 2 but showing the cover lodged in its ultimate position in suitable retaining means on the wheel structure.
Figure 3:
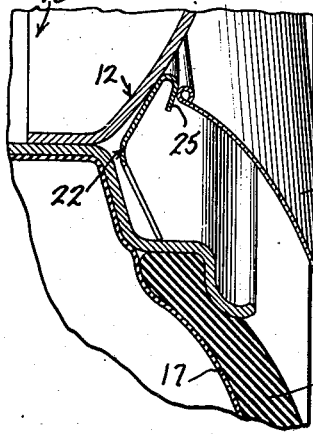
Figure 3:
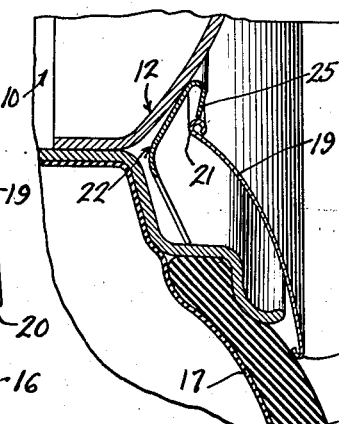
Figure 3:
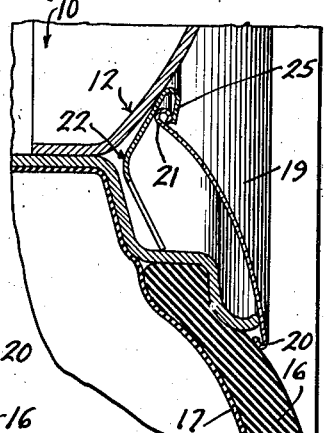
Figure 4:
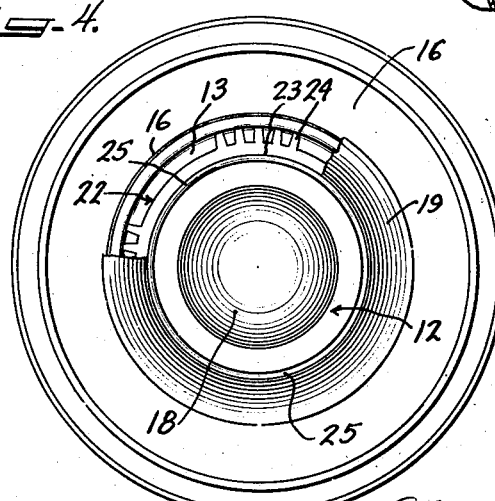
Figure 5:
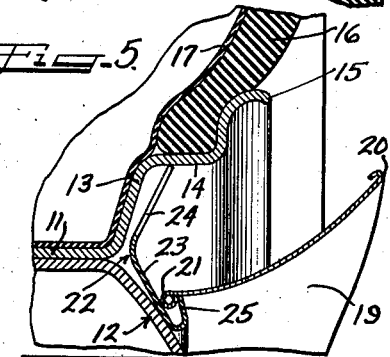

Figure 4 is a side elevational view with parts broken away for illustrative purposes of a construction such as that shown in Figures 1, 2 and 3; and Figure 5 is a fragmentary cross-sectional view of a wheel structure embodying my invention showing the cover member flexed resiliently away from the wheel structure to afford access to the rear side thereof without requiring removal of the same from the wheel structure.

It will be understood that the embodiment shown herein is for illustrative purposes only and may be changed or modified without departing from the spirit and scope of the invention as set forth in the appended claims.

As shown in the drawing, the reference character 10 designates generally a multi-flange, drop center type of tire rim which is connected as by riveting or welding or the like through a base flange 11 to a central body part or spider 12. The drop center rim 10 is further provided with opposite side flanges 13, opposite intermediate flanges 14 and opposite edge portions 15. A suitable tire 16 having an inner tube 17 is mounted on the rim.

As best shown in Figures 3 and 4, the cover assembly includes a central hub cap simulating portion 18 which may be secured to the wheel structure in any suitable and well known manner and an outer annular portion 19 which, as shown herein, is arranged to overlie the outer side of the flanges of the tire rim 10 to conceal the same and, because of the cross-sectional curvature and expanse thereof, constitutes in effect a continuation of the side wall of the tire 16 to give the appearance of being a part thereof. This appearance is augmented, in the present construction, by the fact that the outer peripheral edge of the cover member 19 extends over the edge portion 15 of the tire rim and into adjacency with the side wall of the tire 16 to conceal the junction between the tire and the rim.

As is well known, the tire 16 during use is subjected to rapid and repeated lateral expanse as portions thereof reach the lowermost position during rotation of the wheel structure. Therefore, to the end that the cover member may breathe or flex in response to this lateral expansion of the side wall of the tire it is preferably constructed, as hereinbefore mentioned, from a sheet material such as synthetic plastic or rubber whereby it possesses resilient flexible characteristics enabling it to be flexed outwardly and away from the wheel structure temporarily at the outer peripheral edge thereof and whereby it will immediately return to a normal position shown in Figure 3 when the flexing pressures are released therefrom.

To the end that the outer, tire abutting, peripheral edge of the cover member 19 will be reinforced to withstand the repeated flexure thereof under the above mentioned conditions or flexure occurring during manipulation of the cover into a position shown in Figure 5 to render the rear side thereof accessible for adjusting wheel balancing weights and inflating the tire, should the tire valve be entirely concealed by the cover member, and to the end that the tire will not be worn or cut during rotation thereof, a curl as shown at 20 is provided to afford a smooth surface adjacent the side wall of the tire. Thus the cover member 19 will breathe with the tire during lateral expansion of the side wall thereof by virtue of a sliding action between the smooth surface of the bead 20 and the adjacent portion of the side wall of the tire.

One of the attributes of the present invention is the attachment of the cover member 19 to the wheel structure in such a manner that it may be resiliently, locally flexed away from the wheel structure into a position shown in Figure 5 without undue bending stresses being concentrated at any particular point thereon and whereby fatigue or breakage does not occur at localized portions of the cover member. It is therefore highly desirable that flexure of the cover member 19 as shown in Figure 5 be accomplished by pivotal action about the inner peripheral part thereof with the resulting elimination of severe bending stresses at that part of the cover.

To this end there is provided herein at the inner peripheral edge of the annular cover member 19, a reinforcing, supporting bead 21, to be described more fully presently, which is arranged to be pivotally seated in a radially outwardly opening groove formed in a retaining member 22. The retaining member 22 includes an annular portion 23 having obliquely disposed, radially outwardly, axially outwardly extending fingers 24 arranged to be disposed in biting engagement with the radially inner surface of the intermediate flange 14 of the tire rim when the retaining member is forced axially inwardly thereof, this biting engagement being accomplished by virtue of the fact that the circle described by the terminal ends of the fingers 24 when in their normal position is slightly greater than described by the radially inner surface of the intermediate flange 14. As will be seen from the drawing the radially inner part of the portion 23 of the retaining means 22 is formed so that it is disposed in adjacency with the outer surface of the body part 12 and includes a radially outwardly turned flange 25 which, together with the annular part 23 of the retaining member provides a radially outwardly opening groove arranged to receive the bead 21 of the cover member 19. It will be seen from Figure 3 that when the bead 21 is disposed in the aforementioned groove, the flange 25 in addition to serving as an attachment element may, if colored or highly polished, serve as an ornamental margin for the inner peripheral edge of the cover member 19 thus greatly augmenting the ornamental appearance of the entire cover assembly on the wheel structure.

One of the problems involved in mounting a flexible cover member such as that shown at 19 upon a wheel structure is the prevention of the imposition of severe localized bending strains upon any part of the cover member during the flexing operation and also the prevention against the snapping out of the inner peripheral edge of the cover member as a result of the flexing operation.

To the end that the foregoing difficulties may be avoided the bead 21 herein is formed so as to most conveniently provide for pivotal action of the cover member during the aforementioned flexing operation whereby localized, severe bending stresses are not imposed upon the cover member and whereby detachment from the retaining member 22 does not result from the flexing action.

As best shown in Figures 3 and 5 the bead 21 is formed by curling the peripheral edge of the cover member 19 in the direction in which the outer, exposed surface thereof is facing. The curling action is performed in this manner in the present instance because the bead retaining groove of the retaining member is to be disposed in a position facing the outer exposed surface of the cover member and because the outer surface thereof will constitute the leading surface during outward flexing thereof from the wheel structure. It will be understood of course that the advantages of my invention may be accomplished generically, by forming the pivot bead so that it extends from substantially the plane of the surface of the cover member which will constitute the leading surface during the pivotal movement thereof which is to be accommodated by the bead.

The above described relationship between the bead and the cover member with which it is associated will be particularly evident from Figure 5 wherein it will be seen that radially inward and axially outward flexure of the cover member 19 has caused the bead 21 to rotate throughout the full extent of the movement of the adjacent portion of the cover member 19. This full pivotal movement of the bead 21 within the groove formed by the portion 23 and flange 25 of the retaining member 22 is afforded by the fact that the portion of the body of the cover 19 which is immediately adjacent the bead 21 has not come into contact with the terminal edge of the flange 25 to bear thereagainst until the flexing movement of the cover member 19 is completed. Thus the body part of the cover 19 has not engaged the terminal edge of the flange 25 to provide a fulcrum which would raise the bead outwardly of the groove to allow disengagement thereof. Furthermore, since the body of the cover member 19 does not abut the edge of the flange 25, at least until the flexing action of the cover is completed, the cover will not be bent therearound to afford completion of the flexing action and for this reason localized, severe bending stresses of the cover member around the edge of the flange 25 do not occur. Instead, the flexing action of the cover member as shown in Figure 5 is completed as the edge of the flange 25 comes into nested relationship with the groove formed between the terminal edge of the bead portion 21 of the cover member and the part of the cover member adjacent the portion thereof which engaged by the terminal edge in the bead. In other words it will be seen that there is here provided a bead construction for the inner peripheral edge of the cover member which is so arranged that it may pivot within the groove afforded by the retaining means and will, throughout the flexing operation, remain within the groove and not be forced outwardly thereof by a fulcrum action of the edge of the groove against a moving portion of the body of a cover member. With the construction described above, it will be seen that the edge of the retaining groove is not, during the flexing operation of the cover member, utilized as a lifting fulcrum for the retaining bead and furthermore is not utilized as a bending edge about which the inner marginal part of the cover member is flexed to cause localized bending strains to be imposed.

In Figures 1 and 2 the steps which may be utilized in assembling the cover member 19 upon the retaining member 22 are clearly disclosed. As indicated previously the cover member is constructed from a material having resilient, elastic qualities and these characteristics are here utilized to mount the cover member 19 upon the retaining means 22.

As will be evident from Figure 1, the diameter of the circle described by the bead 21 is considerably smaller than that described by the peripheral edge of the flange 25 and accordingly it is desirable that the bead be inserted in the groove of the retaining member 22 and thus over the terminal edge of the flange 25 in easy on-hard off relationship. This is accomplished herein, as shown in Figure 1, by disposing a portion of the bead within the groove of the retaining member so that the diametrically opposed portion of the bead assumes a position radially inwardly of the adjacent portion of the peripheral edge of the flange 25. Thereafter, as shown in Figure 2, the entire cover 19 may be shifted radially so that the already inserted portion of the bead 21 may be distorted and thus drawn entirely into the adjacent portion of the groove of the retaining member under which circumstances the diametrically opposed portion of the bead 21 has been shifted radially outwardly a distance sufficiently great so that the adjacent portion of the edge of the flange 25 may be overridden thereby to permit axial inward movement of that portion of the bead 21 into the groove. Thereafter release of the cover member results in a self-centering movement thereof since the distorted portion of the bead again expands to move partially outwardly of the groove thereby to draw the diametrically opposed portion thereof further into the groove so that the cover assumes an ultimate concentric position such as that shown in Figure 3.

As will be evident from the lower portion of Figure 2, the cross-sectional configuration of the elastically, resiliently flexible cover member 19 is such that the bead 20 thereof engages the side wall of the tire before the bead 21 at the inner peripheral edge thereof has been moved into its extreme axially inner position and thus completion of the assembly of the cover member with the retaining member by means of further axial inward movement of the bead 21 slightly distorts the cover member cross-sectionally to provide a pressure engagement of the bead 20 at the outer peripheral edge thereof against the side wall of the tire. This fact is of importance in counteracting the tendency of the outer peripheral edge thereof to move axially outwardly, away from the side wall of the tire under the influence of centrifugal force developed during high speed movement of the vehicle to which the wheel is attached. It will be seen however that the pressure created between the bead 20 and the side wall of the tire is not so great as to in any way detract from the outward flexing movement thereof from the wheel structure to render the rear side of the cover member 19 accessible. It will be understood that removal of the cover member 19 from the retaining means is accomplished by a reversal of the above described procedure.

From the foregoing it will be seen that there is provided herein a cover assembly for a wheel structure whereby the attachment and detachment of the cover member is accomplished with ease and facility and whereby the cover is entirely protected against localized, severe bending forces during axially outward movement of the outer peripheral edge thereof away from the wheel structure, the latter advantage being accomplished by a novel configuration of the cover member at the beaded portion thereof which serves as the pivot during flexing action thereof.

What I claim is:

1. In a cover structure for a wheel including a tire rim part and a body part, a cover retaining member attached to said wheel and having a groove, a resiliently flexible annular cover member, and a bead at one margin of said cover member wedged between the sides of said groove but spaced from the bottom thereof.

2. In a cover structure for a wheel including a tire rim and a body part, a grooved cover retaining member secured on said wheel, and a resiliently flexible annular cover member having a bead at its inner periphery disposed in the groove of said retaining member in spaced relation to the bottom of said groove for radial movement of said cover member to facilitate application and removal thereof.

3. In a cover structure for a wheel including a tire rim and a body part, a retaining member attached to said wheel, a portion of said retaining member defining a groove, and a resiliently flexible annular cover member having one peripheral edge retainingly disposed in said groove but spaced from the bottom of said groove, whereby the cover member may be eccentrically disposed relative to said groove to compensate for dimensional variations of said wheel parts.

4. In a cover structure for a wheel including a tire rim and a body part, a retaining member secured on said wheel and having a groove, an annular cover member of resiliently flexible material, and a bead at one margin of said cover member extending axially outward and rockably retained in said groove for pivoting of said cover member thereabout upon localized axially outward movement of the other margin of said cover member.

5. In a cover structure for a wheel including a tire rim and a body part, a retaining member secured to said wheel, a turned free edge portion on said retaining member defining a groove therewith, and a resiliently flexible annular cover member having a retaining bead at one margin thereof secured in said groove and substantially concealed by said free portion.

GEORGE ALBERT LYON.